United States Patent [19]

Focke

[11] 4,330,977
[45] May 25, 1982

[54] APPARATUS FOR THE HEAT-SEALING OF PACK WRAPPERS AND THE LIKE

[75] Inventor: Heinz Focke, Verden, Fed. Rep. of Germany

[73] Assignee: Focke & Co., Verden, Fed. Rep. of Germany

[21] Appl. No.: 130,686

[22] Filed: Mar. 17, 1980

[30] Foreign Application Priority Data

Mar. 16, 1979 [DE] Fed. Rep. of Germany ....... 2910404

[51] Int. Cl.³ .............................................. B65B 51/14
[52] U.S. Cl. ......................................... 53/379; 53/380
[58] Field of Search .................. 53/379, 380, 378, 329

[56] References Cited

U.S. PATENT DOCUMENTS

| | | | |
|---|---|---|---|
| 3,010,267 | 11/1961 | Richardson et al. | 53/379 |
| 3,236,027 | 2/1966 | Schmermund | 53/379 X |
| 3,431,398 | 3/1969 | Wahle | 53/379 X |
| 4,104,849 | 8/1978 | Mosse | 53/379 |
| 4,200,555 | 8/1965 | Liedtke | 53/379 X |

Primary Examiner—James F. Coan
Attorney, Agent, or Firm—Sughrue, Mion, Zinn, Macpeak and Seas

[57] ABSTRACT

The invention relates to an apparatus for the heat-sealing of surfaces of articles, in particular for the sealing of closing flaps of a wrapper of a cuboid pack, in conjunction with a packaging machine, the packs being conveyed one above the other or side by side and transversely movable sealing jaws being provided which can be moved cyclically towards the surfaces to be sealed. Especially, the invention relates to the processing of cigarette packs. On the one hand, this can concern the outer wrapper of such a pack, consisting of regenerated cellulose film or of another heat-weldable packaging material. However, the cigarette pack concerned can also consist entirely of a (multi-ply) sealable film.

12 Claims, 7 Drawing Figures

APPARATUS FOR THE HEAT-SEALING OF PACK WRAPPERS AND THE LIKE

The surfaces of the pack, which are here to be subjected to heat and pressure, follow from the particular selected folded construction of the wrapper. In the case of so-called longitudinal folding, the blank is laid around the pack in the shape of a U, starting from the bottom of the pack. In this case, mutually overlapping side flaps which are to be welded together are formed in the zone of the two side faces of the packs. Moveover, closing flaps which are to be joined to one another are formed in the zone of the upper end face. In an embodiment with so-called transverse folding, a tubing seam which must be sealed results merely in the zone of one side face. Furthermore, closing flaps which are to be sealed to one another are formed in the zone of the end face and of the bottom.

The apparatus according to the invention deals with all the above closing flaps and with the joining of the latter to one another by thermal welding or sealing.

In high-speed packaging machines, fairly frequently occurring changes in the working speed are unavoidable. These can be due to faults in the packaging machine itself or to changing rates in the sector of pack supply or cigarette supply. This means that the number, arising per unit time, of packs to be sealed varies within a certain range.

The elements of the packaging machine, in particular conveyors and the like, are set to take account of this situation. The consequence is that the packs remain for different periods in the zone of sealing stations. The sealing process must be adapted to this fact if uniform quality of sealing is to be ensured.

It is therefore the object of the invention to propose an apparatus for the sealing of packs and the like, which makes it possible in a simple reliable manner to adapt to the varying operating conditions of the packaging machine or the like in such a way that an always uniform quality of execution of sealing is obtained.

This object is achieved by the apparatus according to the invention, wherein several sealing jaws at the same or at a different sealing temperature can be moved alternatively or together towards the surfaces, which are to be treated, of the packs or the like.

In the invention, the variable situations are taken into account by switching the sealing jaws in or out. This can be effected by activating several sealing jaws successively in the conveying direction of the packs, a larger or smaller number of sealing jaws being available depending on the requirements. The welding jaws which come into effect alternatively or together can here have different heating temperatures. Preferably, however, the heating temperature is kept substantially constant for each individual sealing jaw in all the embodiments of the invention.

Further details of the invention relate to the constructional design of the sealing jaws and to devices for effecting movements of the jaws.

Illustrative embodiments of the invention are explained in more detail in the following text by reference to the drawings in which.

The illustrative embodiments, shown in the drawings of apparatus for heat-sealing relate to the processing of (cuboid) packs 10 for cigarettes or the like. On these packs in turn—by way of example—outer wrappers are sealed in the zone of one side face 11 and in the zone of two mutually opposite end faces 12 and 13: mutually overlapping closing flaps are joined to one another by heat and pressure.

Figure 1:
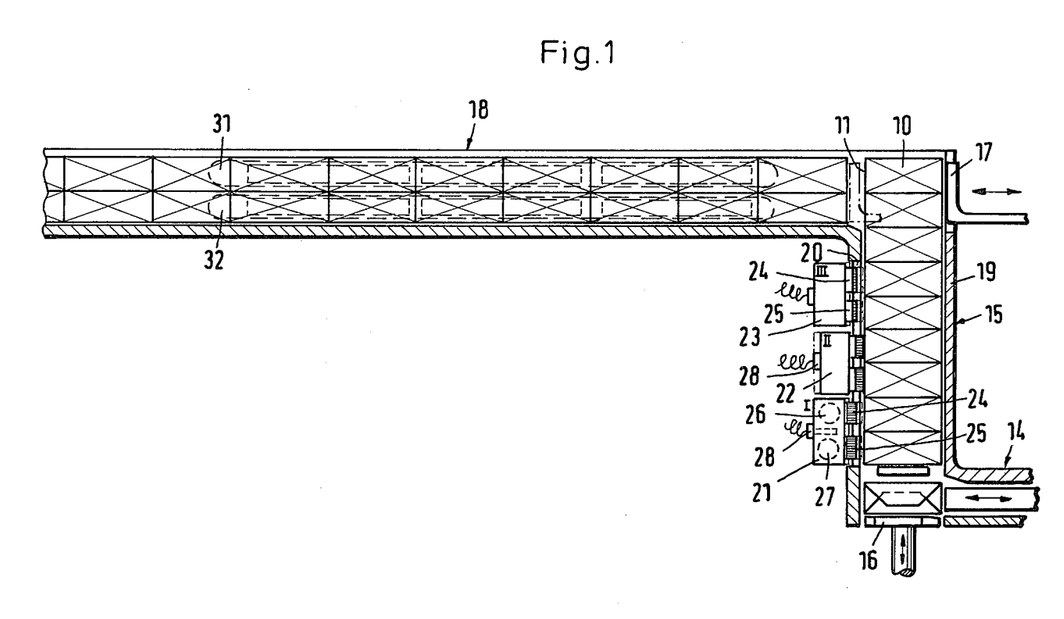
FIG. 1 shows a part of a packaging machine for cigarettes in side view or in vertical section, with devices for the sealing of surfaces of the packs.
Figure 2:
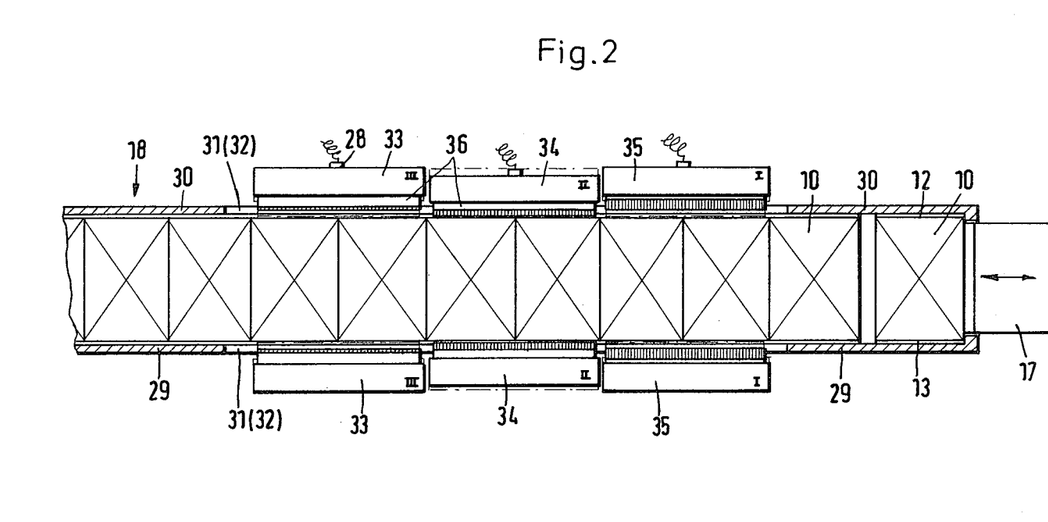
FIG. 2 shows a plan relating to FIG. 1.

The packs 10 conveyed out of a packaging machine (not shown in detail in the drawings) pass from a lower packing line 14 to the lower end of a packing tower 15. In the latter, the packs 10 are cyclically conveyed in the upper direction in close packing one above the other, a lifter 16 acting from below pushing the packs 10 successively into the packing tower 15 and thus lifting the existing stack of packs 10 each time by a further pack 10. At the upper end of the packing tower 15, two packs 10 lying above one another in the present case are together pushed away and into an upper horizontal packing line 18 each time by a transverse ram 17. The transport of the double row of packs 10 lying above one another is here also effected by the cyclic insertion of two packs 10 each time.

Within the range of the packing tower 15, only blank flaps in the zone of one side face 11 are heat-sealed—because of the folded construction of the outer wrapper, assumed here. In this zone, the packing tower 15 formed by side walls 19 is provided with an aperture 20 which continues over the height of several packs 10.

Through this aperture 20, sealing tools are brought into contact with the side faces 11 of the packs 10. In the present case, several, namely three, sealing jaws 21, 22 and 23 are arranged one above the other. These can be pressed, together or alternatively, against the packs 10 in order to act on the side faces 11. Each sealing jaw 21..23 is designed in the present case as a double tool, namely with two sealing strips 24 and 25. Accordingly, two packs 10 are always treated simultaneously by each sealing jaw 21..23 since each (heated) sealing strip 24, 25 comes into contact with one pack.

The sealing jaws 21..23 or their sealing strips 24, 25 are in the present case heated to different temperatures. These are generated by heating rods 26, 27 of a suitable known design, which are associated with each sealing strip 24, 25. To maintain a substantially constant temperature, a temperature sensor 28 is provided.

The sealing jaws 21..23 designed in this way can be moved independently of one another by a mechanism which is not shown here in detail. Depending on the heat energy required for carrying out the welding or sealing, all the sealing jaws 21..23 or only single sealing jaws can be fed forward to the packs 10 in each sealing cycle. Accordingly, the lowest sealing energy is transferred when the packs 10 are treated only in the zone of the sealing jaw 23. A correspondingly stronger action is obtained when, for example, the sealing jaw 22 is switched in, and so on.

Sealing of the end faces is carried out in the zone of the horizontal packing line 18. Both end faces 12, 13, here point sideways, that is to say transversely to the transport direction. To carry out sealing, the packing line 18 is provided in the zone of its side walls 29 and 30 with elongate slot-like perforations 31 and 32. Sealing jaws 33, 34, 35 on both sides of the packing line 18, or the sealing strips 36 of these sealing jaws, pass through these perforations. In cross-section and in the remaining construction, the sealing jaws 33..35 are formed in the same way as the sealing jaws 21..23. Accordingly, the sealing jaws 33..35 can also be moved individually, namely in such a way that they can be pressed against the packs 10 from both sides. Therefore, depending on the conditions, it is also possible to supply very individually selected, stepped sealing energies for the sealing of the end faces 12, 13.

In the direction of movement, the sealing jaws 33..35 are in the present case of such dimensions that two packs 10, following one another in the transport direction, are treated simultaneously. Accordingly, four packs 10 are sealed during each sealing cycle of a sealing jaw.

Figure 3:
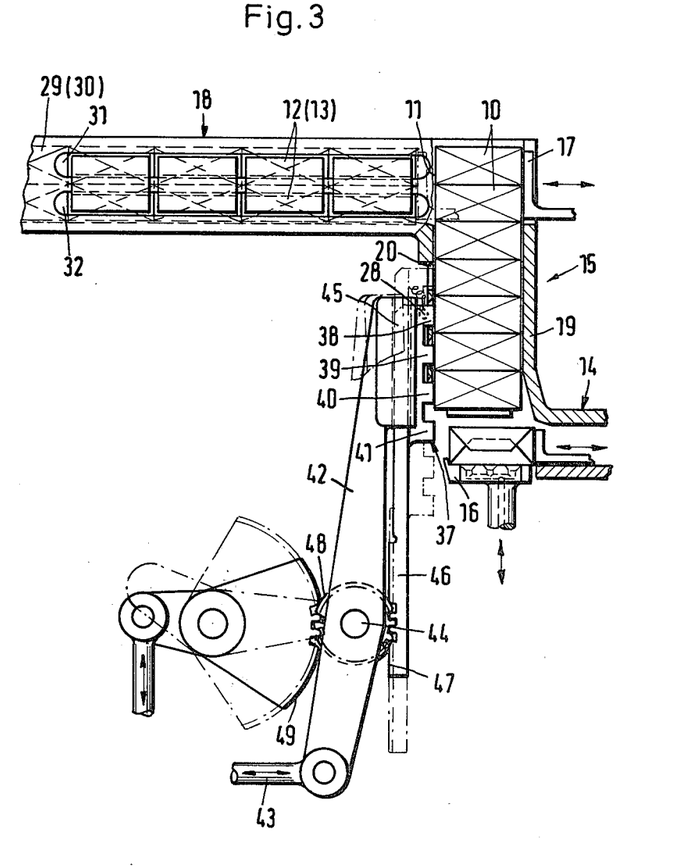
FIG. 3 shows another embodiment for the sealing of packs, likewise in side view or vertical section.

The embodiment according to FIG. 3 concerns an alternative for sealing the side faces 11 of the packs 10. For this purpose, a common sealing jaw 37 is used. This is designed as an elongate upright structure and its height is adjustable. Several, namely four, sealing strips 38, 39, 40 and 41 are provided for the direct transfer of pressure and heat. These strips are each lined up with one side face 11 of a pack 10, that is to say they are correspondingly formed with respect to their mutual spacing. The sealing jaw 37 as a whole is subjected to a temperature which is constant for all the sealing strips 38..41. Variations in respect of the sealing energy supplied in total to the packs 10 can be effected by varying the number of "active" sealing strips 38..41, depending on the given conditions. In the position shown, the sealing jaw 37 is offset slightly downwards relative to the packing tower 15 so that only three of the four sealing jaws come into use in each sealing cycle. The number of active sealing strips can be reduced correspondingly by further downward adjustment.

To carry out the sealing cycles, the sealing jaw 37 is connected to a pivot arm 42 which is pivotable about a bearing 44 as a result of being driven by a push rod 43. The requisite contact pressures are transmitted by the pivoting motions.

The height of the sealing jaw 37 relative to the pivot arm 42 is adjustable. For this purpose, the sealing jaw 27 is mounted in a positive upright guide 45 of the pivot arm 42. An extension 46 of the sealing jaw 37 is designed as a rack 47. This in turn engages with a pinion 48 which is held in a bearing 44 and which in turn is driven by a pivotable toothed segment 49 in one or the other direction. This toothed segment 49 can be controlled in a suitable manner in accordance with parameters given by the working cycle of the packaging machine.

The illustrative embodiment according to FIGS. 4 and 5 again relates to the sealing of two mutually opposite end faces 12, 13 of the packs 10 in the zone of a horizontal packing line 18. On both sides of the latter, two sealing jaws 50 and 51, heated to different temperatures, can alternatively be lined up with the packs 10. All the sealing jaws 50 and 51 are here likewise equipped with two sealing strips 52, 53. A common heating element 54 is built into each of the sealing jaws 50, 51, which heating element generates different but constant temperatures in the two sealing jaws 50, 51.

Figure 4:
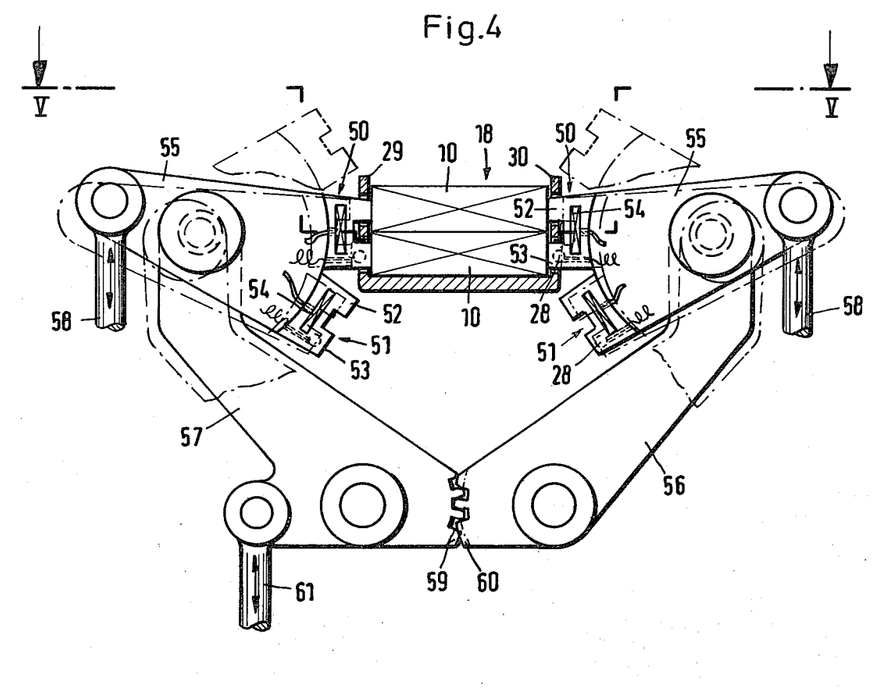
FIG. 4 shows an embodiment of the apparatus with sealing jaws for horizontally conveyed packs, in cross-section or in side view of the welding jaws.
Figure 5:
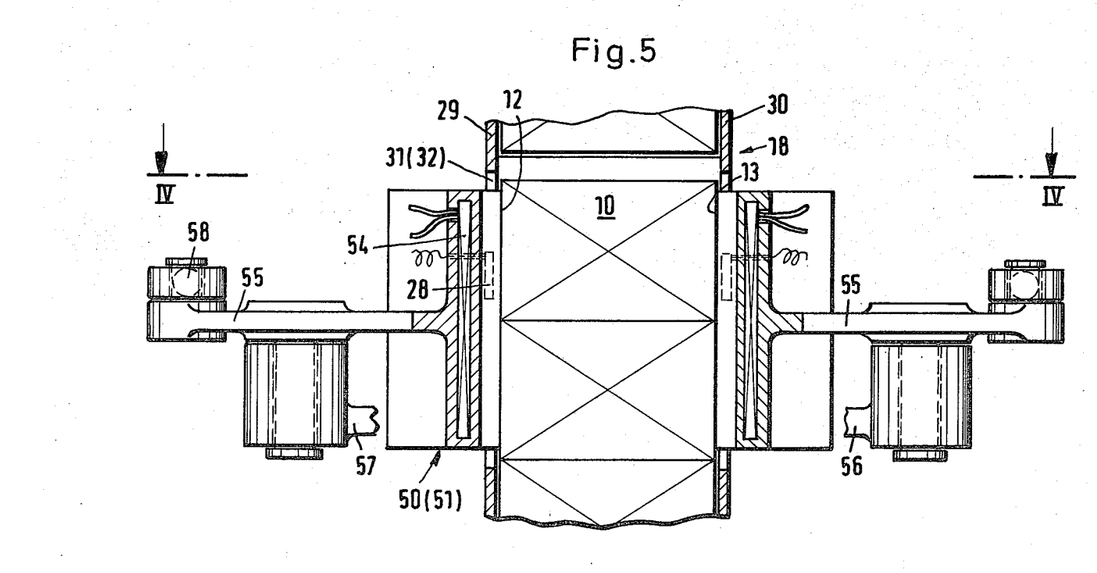
FIG. 5 shows a plan view or a horizontal section V-V from FIG. 4.

The two sealing jaws 50, 51 are mounted on a common segment holder 55. The latter executes transverse movements for engaging the packs 10 as well as those movements, by means of which one or the other sealing jaw 50, 51 is brought into the working position.

For this purpose, the segment holder 55 is pivotably mounted as a two-armed lever on the end of a pressure arm 56 or 57. At the free end of the segment holder 55, a ram 58 acts in a pivoting sense such that a pivoting motion can take place when the sealing jaws 50, 51 are retracted.

To transmit the sealing forces, the segments holders 55 of both sides are together subjected to the action of the pressure arms 56, 57 which are likewise pivoted together. For this purpose, the pressure arms 56, 57 mutually engage via toothed segments 59, 60. A pivoting motion of one pressure arm 57—transmitted by a rod 61—effects a pivoting motion of the other pressure arm 56 in the opposite direction. The consequence is that the two segment holders 55 are moved towards the packing line 18 or towards the packs 10.

Figure 6:
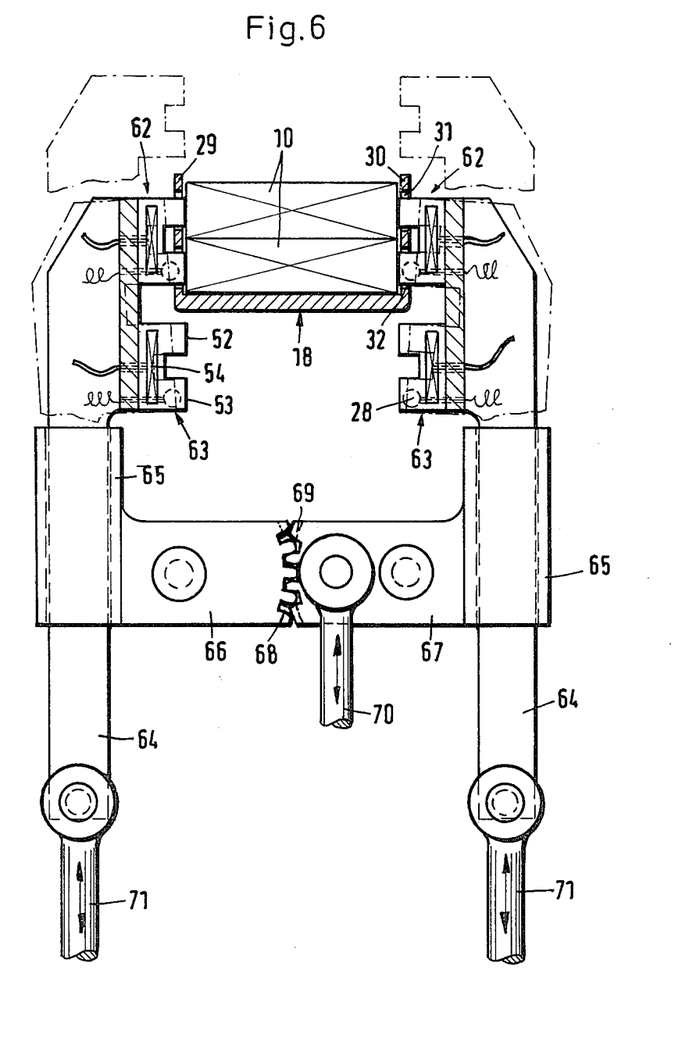
FIG. 6 shows a further embodiment of an apparatus for the sealing of packs in a representation corresponding to that in FIG. 4.

The apparatus according to FIG. 6 is constructed in a similar manner. This is also used for the sealing of end faces 12, 13 in the zone of a horizontal packing line 18. With regard to the construction, heating and the like of the sealing jaws 62 and 63, reference can be made to the illustrative embodiment according to FIGS. 4 and 5.

A common holder 64 for the sealing jaws 62, 63 is mounted in a guide 65 of actuating arms 66, 67. These actuating arms 66, 67 which are pivotable as two-armed levers mutually engage via toothed segments 68, 69. A common rod 70 effects the transmission of contact pressures to the particular sealing jaw which is in the working position. For an alternative lining-up of one or the other sealing jaw, the height of the holder 64 in the guide 65 can be adjusted, specifically by appropriate push rods 71.

Figure 7:
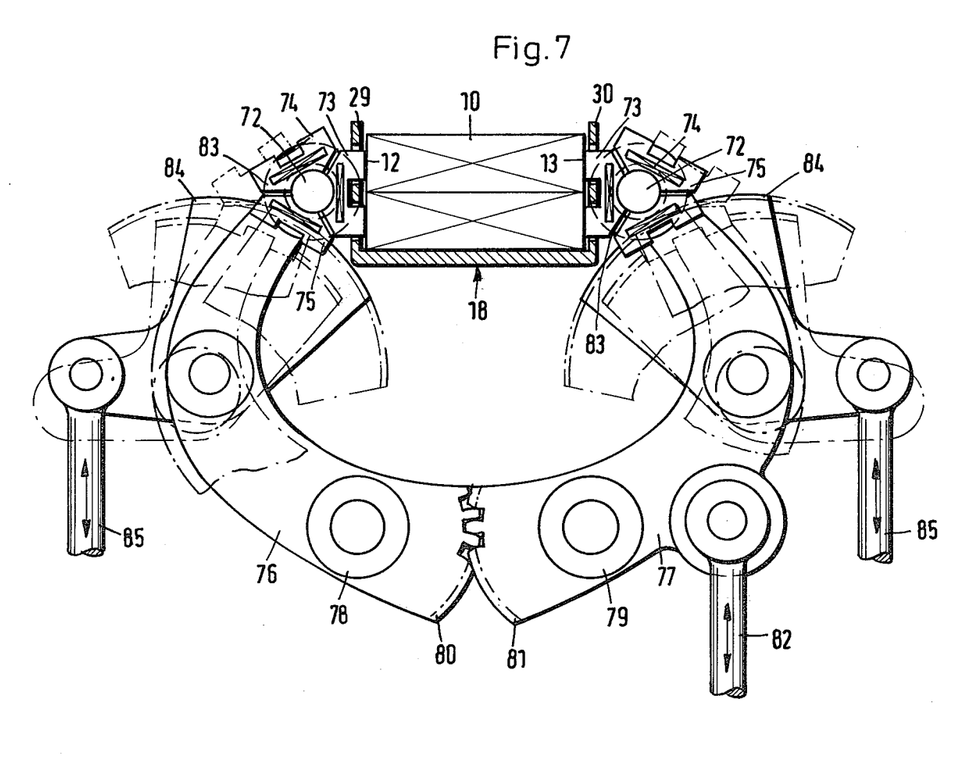
FIG. 7 shows a further modified embodiment of an apparatus for sealing, likewise in a representation corresponding to that of FIGS. 4 and 6.

The apparatus according to FIG. 7 can preferably be employed in the same field as the preceding illustrative embodiments, that is to say for end faces 12, 13. In this case, three sealing jaws 73, 74 and 75, arranged at equal mutual angular spacing, are provided on a common rotatable carrier 72. By rotating the carrier 72 through an angle of 120°, these sealing jaws can be moved alternately into the working position, namely into the zone of the packs 10. The sealing jaws 73..75 are heated to different but preferably constant temperatures.

In the present case, the carriers 72 are mounted on arcuate pressure arms 76, 77. The latter are pivotable about a bearing 78, 79 and mutually engage via toothed segments 80, 81. Accordingly, a common rod 82 is used for driving both the pressure arms 76, 77.

For selecting the particular sealing jaw 73..75, namely for rotating the carrier 72, the latter is provided with a toothed wheel 83. The latter meshes with a toothed segment 84 mounted on the pressure arm 76, 77. The particular desired rotations of the carrier 72 are effected by a pivoting motion of the toothed segment 84, initiated by a push rod 85.

I claim:

1. An apparatus for the heat-sealing of surfaces of articles, in particular for the sealing of closing flaps of a wrapper of a cuboid pack in a packaging machine in which packs are conveyed adjacent one another, comprising: a plurality of support means; at least one sealing jaw being mounted on each said support means; said support means being movably mounted to move said at least one sealing jaw mounted thereon in a direction perpendicular to a direction of conveyance of said packs; each said at least one sealing jaw having a plurality of sealing strips; and each said support means being further movably mounted and being moved in accordance with a state of an operating process of said apparatus to move selected ones of said sealing strips of each said at least one sealing jaw towards surfaces to be treated of said packs.

2. The apparatus according to claim 1 wherein each of said sealing strips of each said at least one sealing jaw is at the same temperature.

3. The apparatus of claim 1 wherein different ones of said sealing strips of each said at least one sealing jaw is at a different temperature.

4. The apparatus of claim 1 wherein a plurality of sealing jaws are provided on each said support, said plurality of sealing jaws on each said support being arranged successively in said conveying direction of said packs, each said sealing jaw of each said support having sealing strips at different temperatures.

5. The apparatus of claim 1 wherein each said sealing jaw has two sealing strips arranged spaced apart from one another by a distance such that each said strip can be lined up with a successive one of said packs.

6. The apparatus according to claim 1 wherein each said sealing jaw has a plurality of sealing strips spaced apart by one another by a distance such that each sealing strip can contact one pack, and wherein said support is movably mounted in such a manner that a selected number of said sealing strips can be lined up with a corresponding number of packs during a sealing cycle.

7. The apparatus according to claim 6 wherein said apparatus further comprises an upright packing tower, and wherein each said support is movable in a vertical direction such that a first selected number of said sealing strips are active and are positioned to come into contact with side faces of said packs and a second number of said sealing strips are inactive and located outside a zone of said packs within said packing tower.

8. The apparatus according to claim 1 wherein said support means comprises a holder movable in a first direction for adjusting sealing pressure and in a second direction for setting a desired number of sealing strips into an active position.

9. The apparatus according to claim 1 wherein said support means comprises a pivot arm having an adjustable height.

10. The apparatus according to claim 6 wherein said support means comprises a common segment holder pivotally mounted along a packing line to be movable transversely to said packing line, and wherein two sealing jaws are mounted on said common segment holder.

11. The apparatus according to claim 6 wherein said support means comprises a rotatable carrier and wherein three sealing jaws are mounted on said rotatable carrier at equal angular positions, wherein a selected one of said three jaws can be moved into an active position by rotating said rotatable carrier.

12. The apparatus according to claim 6 wherein said support means comprises first and second pressure arms; an engaging mechanism connecting said first and second pressure arms wherein movement of one of said pressure arms produces a corresponding movement of the other of said pressure arms; and wherein at least of one said sealing jaws is mounted of each of said pressure arms, sealing jaws on said first and second pressure arms being located on opposite sides of said packs along a packing line.

* * * * *